US011420345B2

(12) United States Patent
Furuta et al.

(10) Patent No.: US 11,420,345 B2
(45) Date of Patent: Aug. 23, 2022

(54) ROBOT (71) Applicant: FANUC CORPORATION, Yamanashi (JP)

(72) Inventors: Satoshi Furuta, Yamanashi (JP); Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/837,123

(22) Filed: Apr. 1, 2020

(65) Prior Publication Data
US 2020/0376691 A1 Dec. 3, 2020

(30) Foreign Application Priority Data

May 27, 2019 (JP) .............................. JP2019-098408

(51) Int. Cl.
B25J 19/06 (2006.01)
F16P 1/00 (2006.01)
B25J 18/00 (2006.01)

(52) U.S. Cl.
CPC ............... B25J 19/06 (2013.01); B25J 18/00 (2013.01); F16P 1/00 (2013.01)

(58) Field of Classification Search
CPC ............. B25J 18/00; B25J 18/05; B25J 19/06
See application file for complete search history.

(56) References Cited

U.S. PATENT DOCUMENTS

| 4,685,861 | A | * | 8/1987 | Huetsch | .................... B25J 9/046 192/20 |
| 10,478,970 | B2 | * | 11/2019 | Hannya | ................... B25J 9/1694 |
| 2004/0164697 | A1 | * | 8/2004 | Iribe | ...................... B25J 13/088 318/568.12 |
| 2016/0089797 | A1 | * | 3/2016 | Kawase | ................. B25J 19/005 74/490.02 |
| 2017/0072574 | A1 | * | 3/2017 | Smallridge | .............. B25J 17/00 |
| 2017/0080582 | A1 | * | 3/2017 | Mugnier | .............. B25J 19/0091 |

FOREIGN PATENT DOCUMENTS

| CN | 108705561 | * | 10/2018 |
| CN | 109318218 | * | 2/2019 |
| JP | 5-208394 | * | 8/1993 |
| JP | 2013-163224 A | | 8/2013 |
| JP | 2016-064451 A | | 4/2016 |
| WO | WO 2018/042692 | * | 3/2018 |

* cited by examiner

Primary Examiner — William C Joyce
(74) Attorney, Agent, or Firm — Maier & Maier, PLLC (57) ABSTRACT A robot including: two link members with longitudinal axes that are coupled such that the link members are able to relatively rotate about an axial line; and a sensor that detects a force around the axial line acting between the link members due to an object pinched between the link members, in which the robot has such a shape that a width dimension in a direction along a plane of a cross-sectional surface of at least one of the link members, which perpendicularly intersects the axial line, on at least one sides from the longitudinal axes that intersect the axial line continuously spread from at least midway positions of the at least one of the link members in the direction of the longitudinal axes toward the axial line, respectively.

4 Claims, 9 Drawing Sheets

ROBOT

CROSS-REFERENCE TO RELATED APPLICATION

This application claims the benefit of Japanese Patent Application No. 2019-098408, the content of which is incorporated herein by reference.

FIELD

The present disclosure relates to a robot.

BACKGROUND

A robot joint structure configured to prevent a hand, an arm, or the like of a user from being pinched between two link members rotating about axial line is known (Japanese Unexamined Patent Application, Publication No. 2016-64451, for example). The joint structure relates to a pinching prevention shape of boundary surfaces of the link members located at roots of the two link members.

SUMMARY

According to an aspect of the present disclosure, there is provided a robot including: two link members each of which has a longitudinal axis and that are coupled such that the link members are able to relatively rotate about an axial line; and a sensor that detects a force around the axial line acting between the link members due to an object pinched between the link members, in which the robot has such a shape that a width dimension in a direction along a plane of a cross-sectional surface of at least one of the link members, which perpendicularly intersects the axial line, on at least one side from the longitudinal axis that intersects the axial line continuously spreads from at least a midway position of the at least one of the link members in a direction of the longitudinal axis toward the axial line.

DETAILED DESCRIPTION OF EMBODIMENTS

A robot 1 according to an embodiment of the present disclosure will be described below with reference to drawings.

Figure 1:
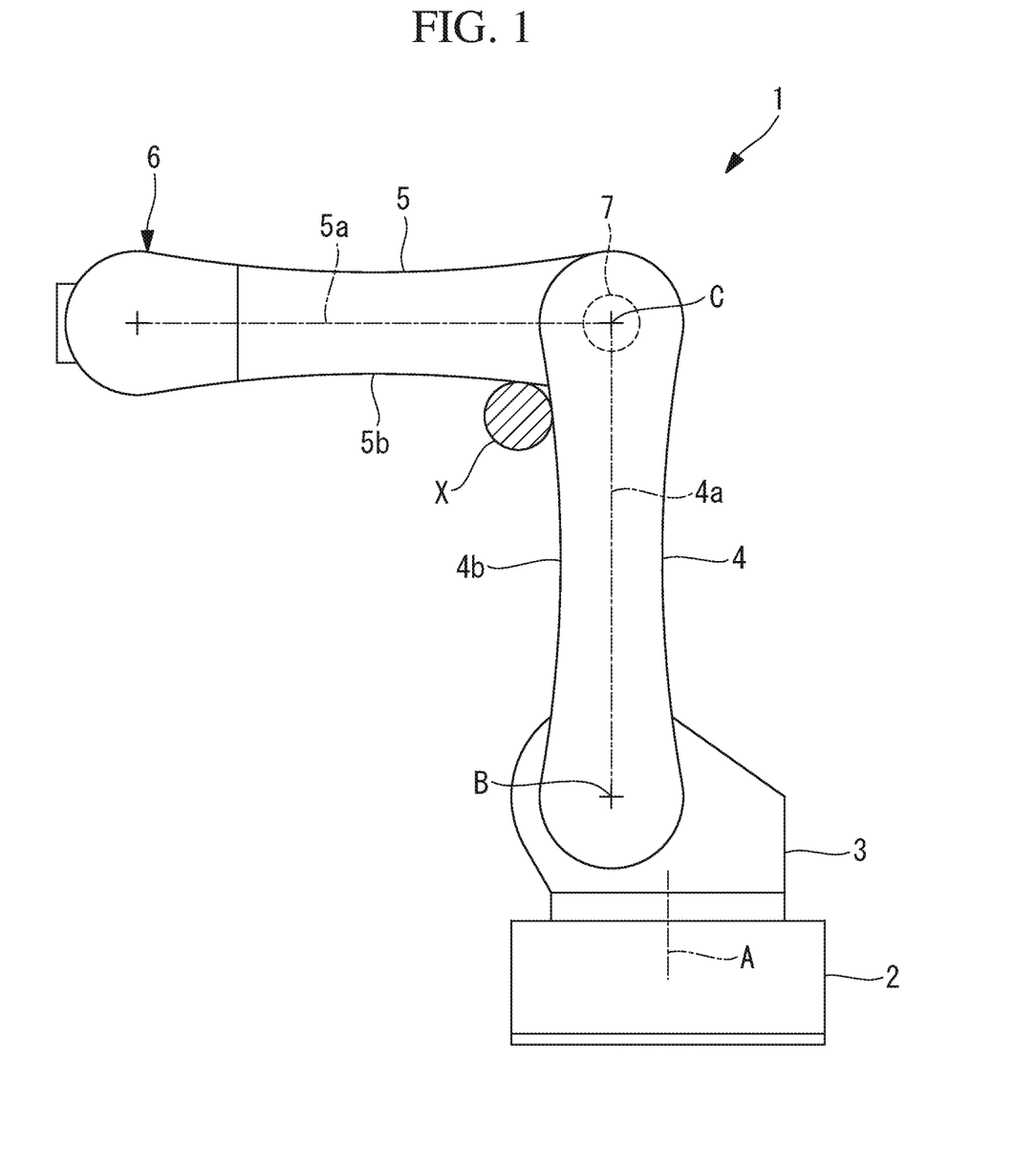
FIG. 1 is a side view illustrating a robot according to an embodiment of the present disclosure.

The robot 1 according to the embodiment includes a swinging body 3 supported such that the swinging body 3 can rotate about a first axial line A that is perpendicular to a base 2 placed on the ground and a first arm (link member) 4 that is supported such that the first arm 4 can swing about a second axial line B that is horizontal with respect to the swinging body 3 as illustrated in FIG. 1. Also, the robot 1 includes a second arm (link member) 5 supported at a distal end of the first arm 4 such that the second arm 5 can swing about a third axial line (axial line) C that is parallel to the second axial line B and a wrist 6 with a three-axis configuration attached to a distal end of the second arm 5.

In addition, the robot 1 includes a sensor 7 that detects a torque (force) around the third axial line C acting between both arms 4 and 5 at a joint that couples the first arm 4 with the second arm 5 such that the first arm 4 and the second arm 5 can relatively rotate about the third axial line C. Examples of the sensor 7 include a torque sensor, a sensor configured to detect a torque from a motor current value, a sensor configured to detect a torque using a secondary encoder, a three-axis or six-axis force sensor, a skin sensor provided on an outer periphery of a link of the arms 4 and 5, and the like. The sensor 7 is connected to a control device, which is not illustrated. The control device controls the robot 1 to stop in a case in which the torque detected by the sensor 7 exceeds a predetermined threshold value.

In the embodiment, each of the first arm 4 and the second arm 5 is configured to have such a shape that a width dimension in a circumferential direction around the third axial line C, that is, a direction along a plane of a cross-sectional surface of each of the first arm 4 and the second arm 5, which perpendicularly intersects the third axial line C, is small in the vicinity of the center in a lengthwise direction and continuously and gradually increases toward both ends. Also, each of the first arm 4 and the second arm 5 has a linearly symmetrical shape with respect to each of central axes (longitudinal axes) 4a and 5a that are straight lines that pass through the third axial line C when seen from a direction along the third axial line C. Further, each of the first arm 4 and the second arm 5 may have a cross-sectional shape with a circular shape, an oval shape, or a polygonal shape with rounded corners around each of the central axes 4a and 5a located at the center.

Specifically, in a case in which the cross-sectional shape is a circular shape or an oval shape, a diameter of the circle or a long diameter or a short diameter of the oval is small in the vicinity of the center in the lengthwise direction and continuously and gradually increases toward both ends. Similarly, in a case in which the cross-sectional shape is a square shape with rounded corners, facing two sides of the square, which are perpendicular to the third axial line C, are small in the vicinity of the center in the lengthwise direction and continuously and gradually increases toward both ends.

A larger curvature of the cross-sectional shape at a position at which an object X is pinched can further reduce a pressure force on the pinched object.

An operation of the robot 1 according to the embodiment configured as described above will be described below.

According to the robot 1 in the embodiment, pinching of the object X occurs when predetermined conditions are satisfied if relative angles of both the arms 4 and 5 decrease in a state in which the object X is disposed between the first arm 4 and the second arm 5. The conditions of pinching depend on friction coefficients between the object X and both the arms 4 and 5 that are determined by surface states of both the arms 4 and 5 and properties of the object, a size of the object X, and the like.

In a case in which a relative angle between the central axis 4a of the first arm 4 and the central axis 5a of the second arm 5 is 90° as illustrated in FIG. 1, for example, an angle between adjacent side surfaces 4b and 5b of the first arm 4 and the second arm 5 is greater than 90° due to such a shape that the width dimension decreases toward the center in the lengthwise direction. At this point, there is a low probability that pinching occurs.

Figure 2:
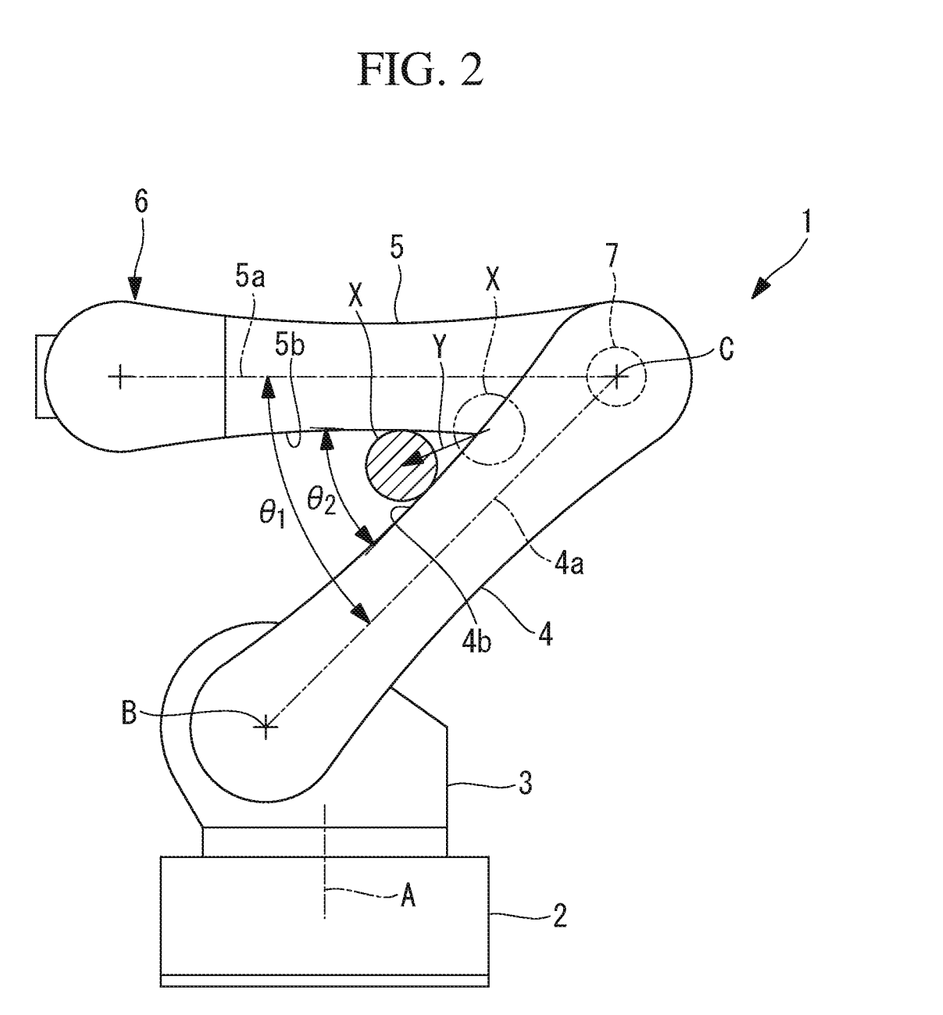
FIG. 2 is a side view for explaining a state in which pinching of an object has occurred in the robot in FIG. 1.

As illustrated in FIG. 2, the object X slides in the direction of the arrow Y with respect to the side surfaces 4b and 5b of the first arm 4 and the second arm 5 and is pushed out in a direction away from the third axial line C between both the arms 4 and 5 as the relative angle between the central axis 4a of the first arm 4 and the central axis 5a of the second arm 5 decreases below 90°. At this time, the angle between the adjacent side surfaces 4b and 5b decreases below 90°, and the probability of pinching increases.

When the conditions of pinching are satisfied at a specific relative angle (first relative angle) $\theta_1$ between the central axis 4a of the first arm 4 and the central axis 5a of the second arm 5, then the object X stops to slide against the side surfaces 4b and 5b of the first arm 4 and the second arm 5. In this manner, the object X is pinched between both the arms 4 and 5 at the position as illustrated in FIG. 2. If the relative angle between the first arm 4 and the second arm 5 further decreases in the state in which pinching has occurred, a torque acting on the first arm 4 and the second arm 5 as a reaction in response to the pressurization of the object X increases.

The torque acting on the first arm 4 and the second arm 5 is detected by the sensor 7, and the control device stops operations of the robot 1 in a case in which the detected torque exceeds a predetermined threshold value. In this manner, it is possible to prevent an excessively large pressurization force from acting on the object X pinched between both the arms 4 and 5.

In this case, both the first arm 4 and the second arm 5 have such shapes that the width dimensions continuously decrease toward the centers in the lengthwise directions in the robot 1 according to the embodiment. In this manner, a relative angle $\theta_2$ between tangent lines of the side surfaces 4b and 5b of the first arm 4 and the second arm 5 at contact points at which the object X is in contact becomes larger than the relative angle $\theta_1$ between the central axis 4a of the first arm 4 and the central axis 5a of the second arm 5 as illustrated in FIG. 2.

In other words, the relative angle $\theta_1$ in the direction along planes of the cross-sections of the first arm 4 and the second arm 5, which perpendicularly intersect the third axial line C, between the central axis 4a of the first arm 4 and the central axis 5a of the second arm 5 that intersect the third axial line C is smaller than the relative angle $\theta_2$ between outermost peripheral outlines of the adjacent first arm 4 and the second arm 5 when the object X is pinched.

As a result, the relative angle between the tangent lines of the side surfaces 4b and 5b of the first arm 4 and the second arm 5 is $\theta_2$ in a relationship between the object X and the side surfaces 4b and 5b of the first arm 4 and the second arm 5 at the time when pinching occurs.

Figure 3:
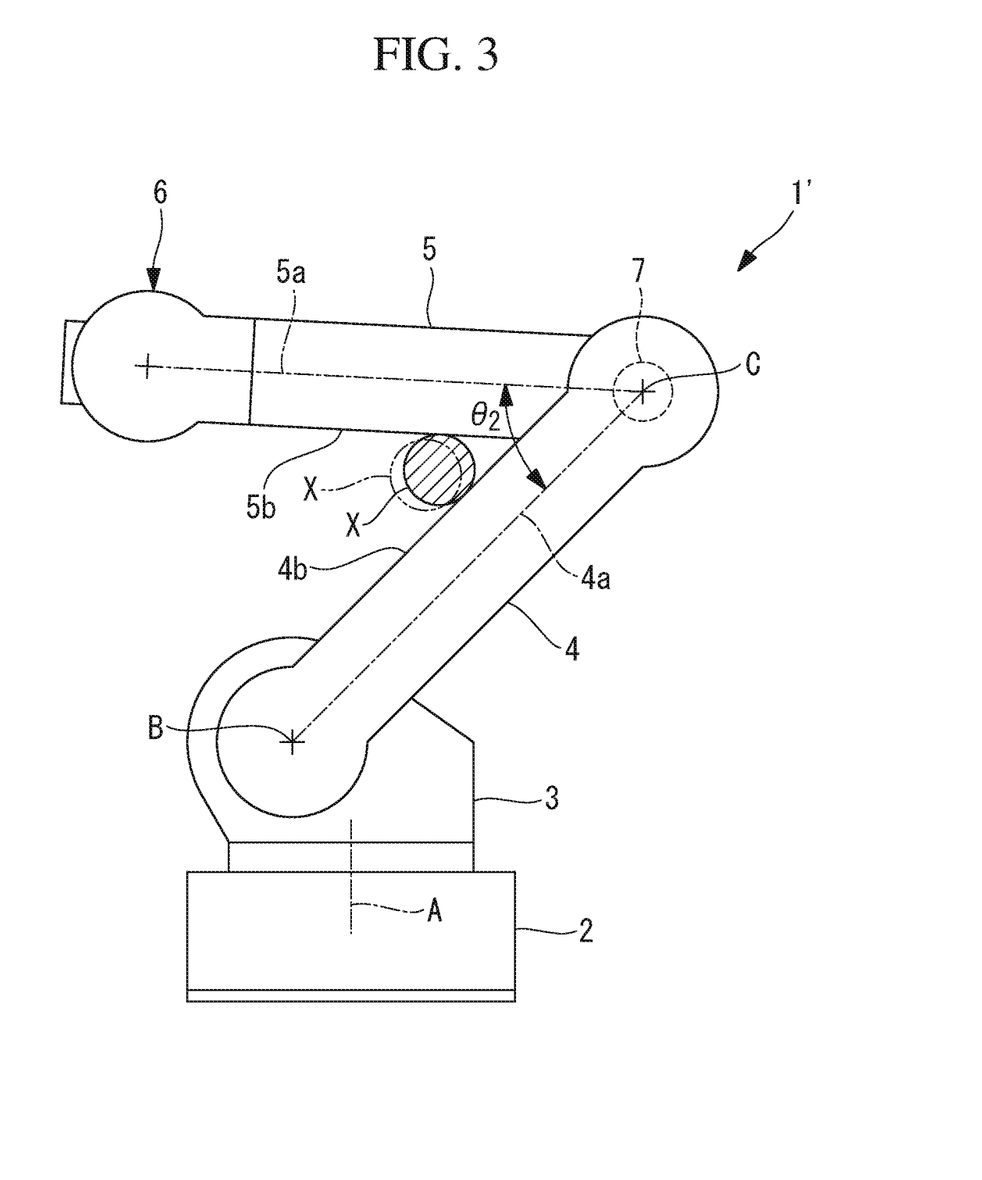
FIG. 3 is a side view for explaining a state in which pinching of an object has occurred in another robot in a comparative example.
Figure 4:
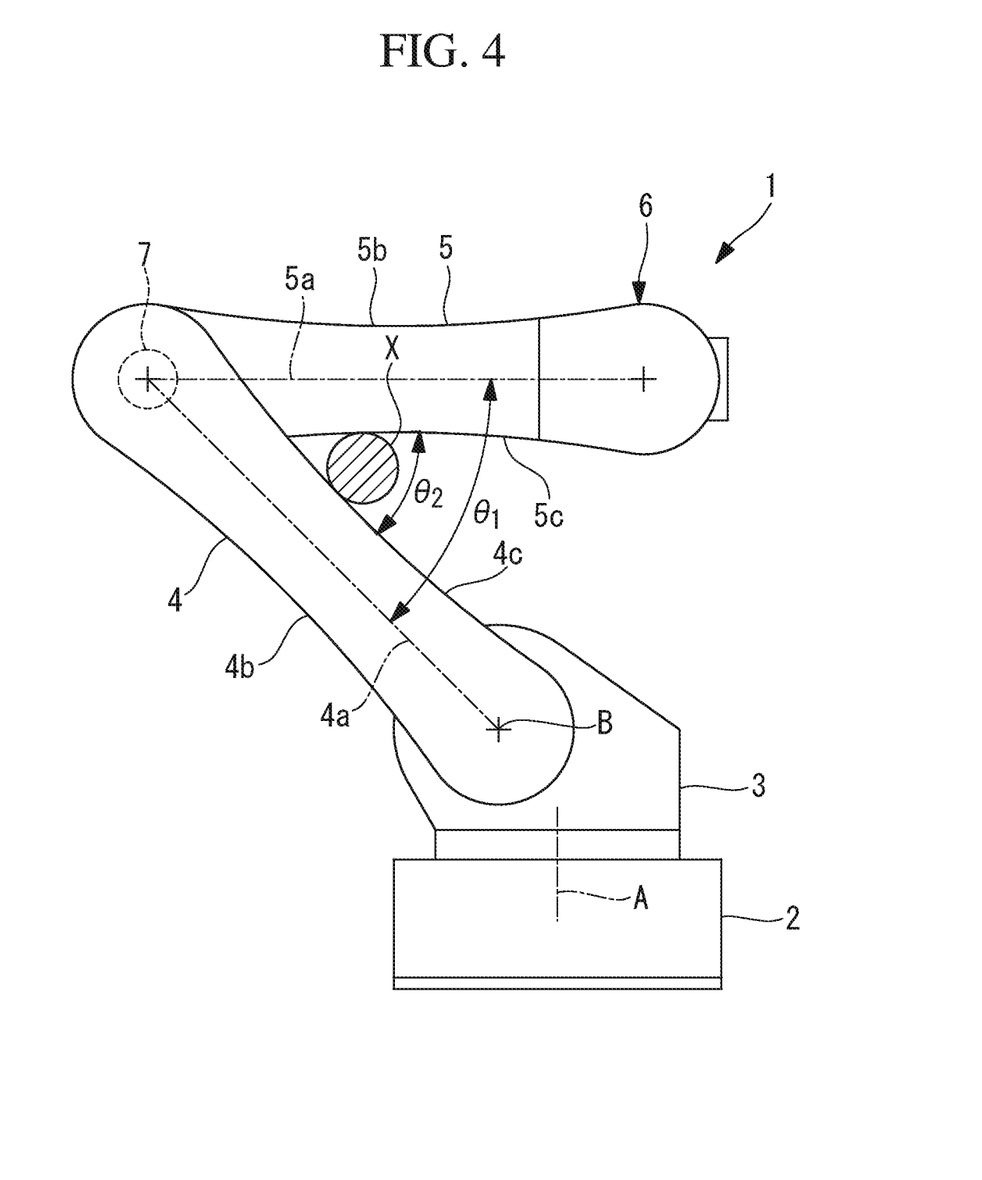
FIG. 4 is a side view for explaining a state in which pinching of an object has occurred in a side surface opposite to the side surface illustrated in FIG. 2 in the robot in FIG. 1.

In a case in which the shapes of the first arm 4 and the second arm 5 are such shapes that the width dimensions do not change in the lengthwise direction as illustrated in FIG. 3, pinching occurs when the relative angle $\theta_2$ is reached between the central axis 4a of the first arm 4 and the central axis 5a of the second arm 5.

As a result, the position of the object X where the pinching occurs in a case of a robot 1' in FIG. 3 is closer to the third axial line C as represented by the solid line than the position of the object X in the case of the robot 1 in FIG. 2 represented by the dashed line in FIG. 3. There is an advantage that the robot 1 in FIG. 2 according to the embodiment more easily detects the pinching even if a pressurization force acting on the object X is smaller than that of the robot 1' in FIG. 3 on the assumption of the same sensitivity of the sensor 7.

Also, the first arm 4 and the second arm 5 have linearly symmetrical shapes with respect to the respective central axes when seen from the direction along the third axial line C in the robot 1 according to the embodiment. This leads to an advantage that it is possible to detect pinching that occurs at opposite side surfaces 4c and 5c of the first arm 4 and the second arm 5 with high sensitivity under the same conditions.

Figure 5:
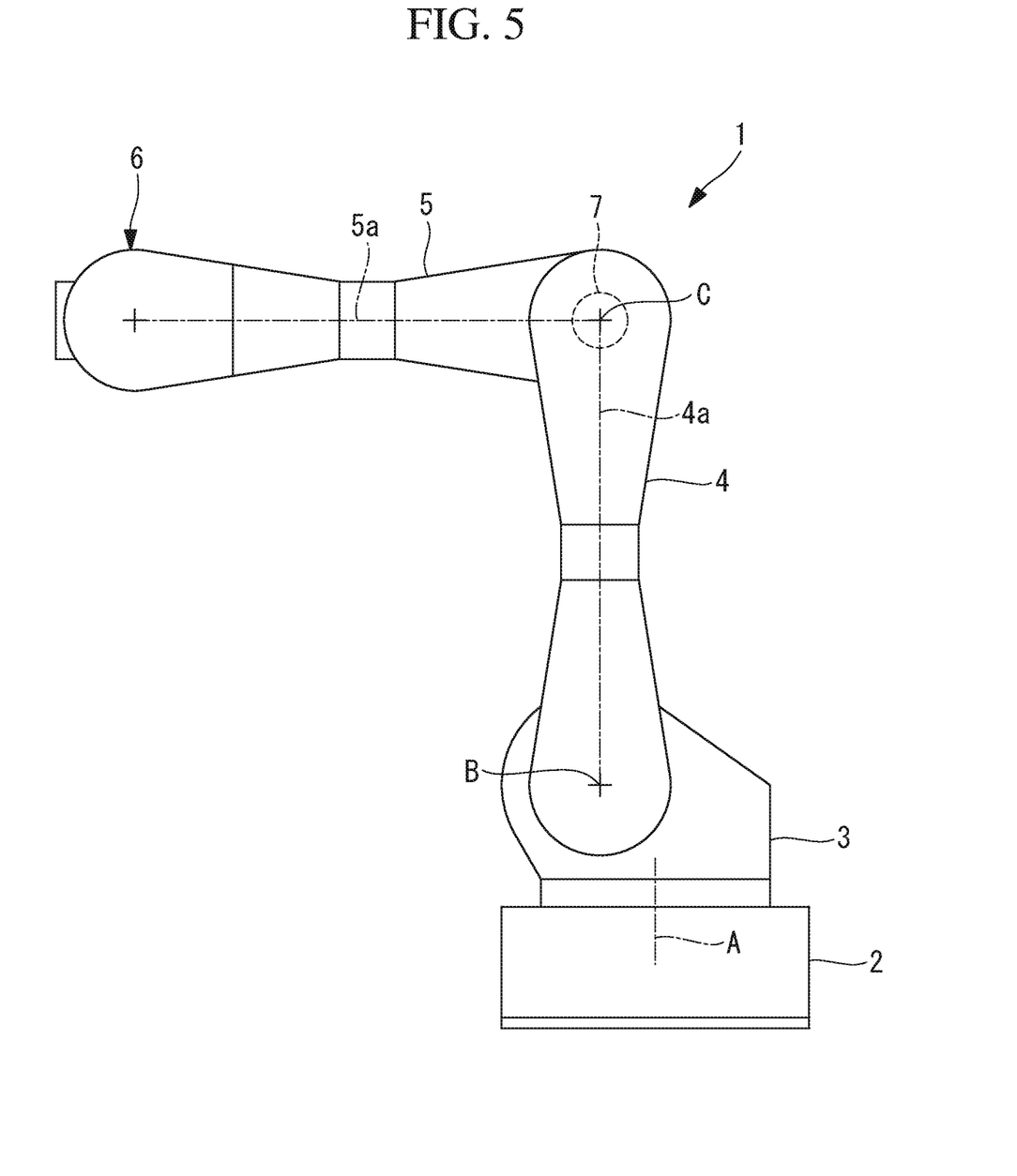
FIG. 5 is a side view illustrating a modification of the robot in FIG. 1.

In the embodiment, the first arm 4 and the second arm 5 have recessed curved outline shapes at portions at which the width dimensions continuously decrease with distances from the third axial line C when seen from the direction along the third axial line C. Instead, the first arm 4 and the second arm 5 may have linear outline shapes as illustrated in FIG. 5 or may have projecting curved outline shapes as illustrated in FIG. 6.

Also, in a case in which the first arm 4 and the second arm 5 start to continuously spread toward the third axial line C at the same position, the relative angle $\theta_2$ becomes larger in the projecting curved outline shape than in the recessed curved outline shape, and it is possible to cause the pinching at a further position. Also, it is possible to reduce the relative angle $\theta_1$ up to the pinching and thereby to widen an operation range of the robot 1 up to the pinching.

Figure 6:
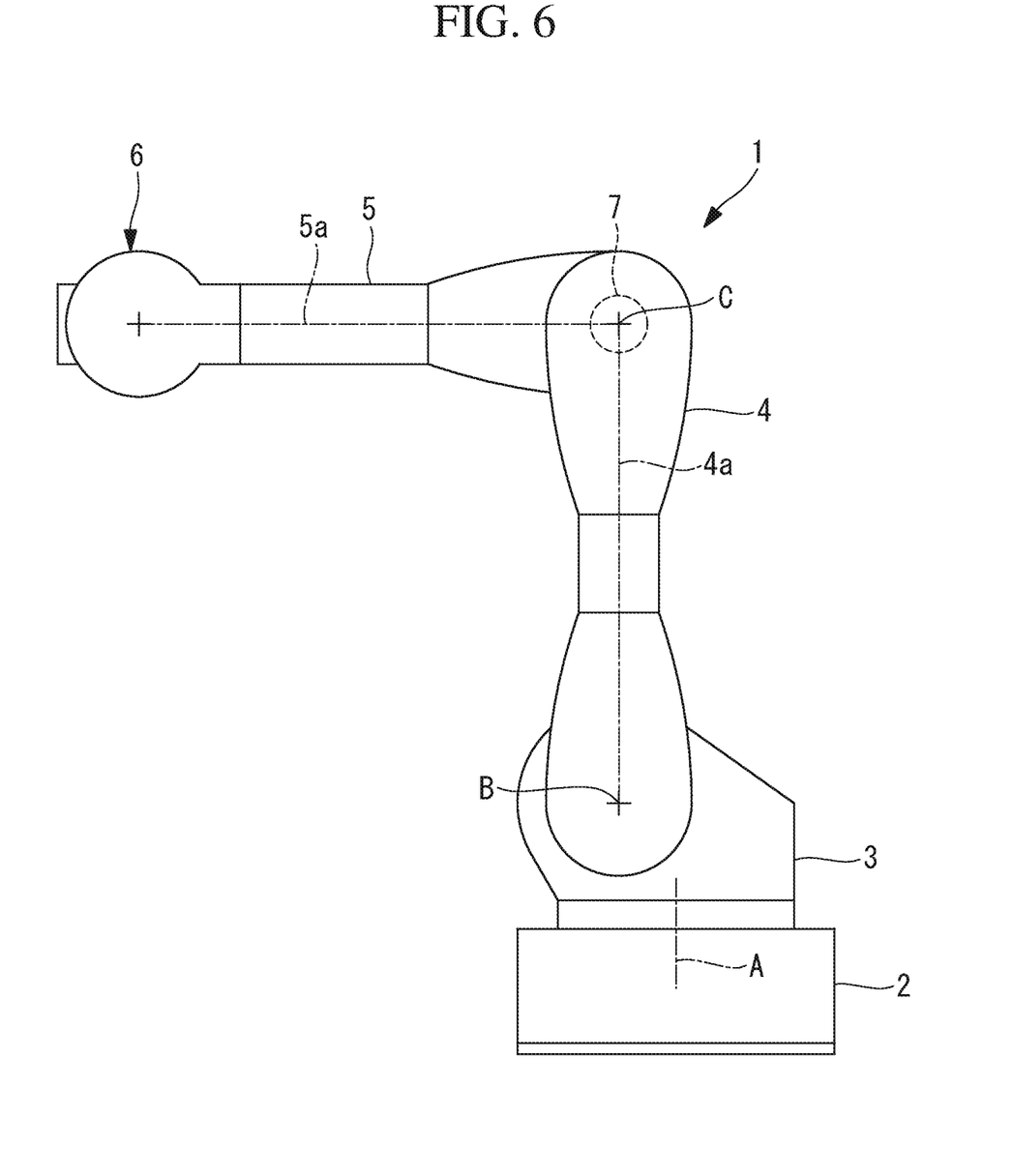
FIG. 6 is a side view illustrating another modification of the robot in FIG. 1.

In addition, the second arm 5 is not limited to such a shape that the width dimension increases from the center in the lengthwise direction toward both the ends, and a portion at which the cross-sectional shape changes may be provided only at one end on the side of the third axial line C as illustrated in FIG. 6. Also, although the first arm 4 and the second arm 5 have been described as examples of the two link members in the embodiment, the link members may be applied to the swinging body 3 and the first arm 4.

In addition, although the case in which both the first arm 4 and the second arm 5 have portions at which the width dimensions continuously decrease with distances from the third axial line C has been described as an example in the embodiment, only the first arm 4 or only the second arm 5 may be provided with such a portion. Also, the first arm 4 and the second arm 5 are adapted such that outermost peripheral outlines of the first arm 4 and the second arm 5 are linearly symmetrical shapes with reference to the central axes 4a and 5a that intersect the third axial line C.

Instead, at least one of the first arm 4 and the second arm 5 may have such a shape that a width dimension in the direction along the plane of the cross-section thereof, which perpendicularly intersects the axial line C, on at least one sides from the central axes 4a and 5a that intersect the axial line C continuously spread from at least midway positions of the central axes 4a and 5a of the first arm 4 and the second arm 5 toward the axial line C, respectively.

Figure 7:
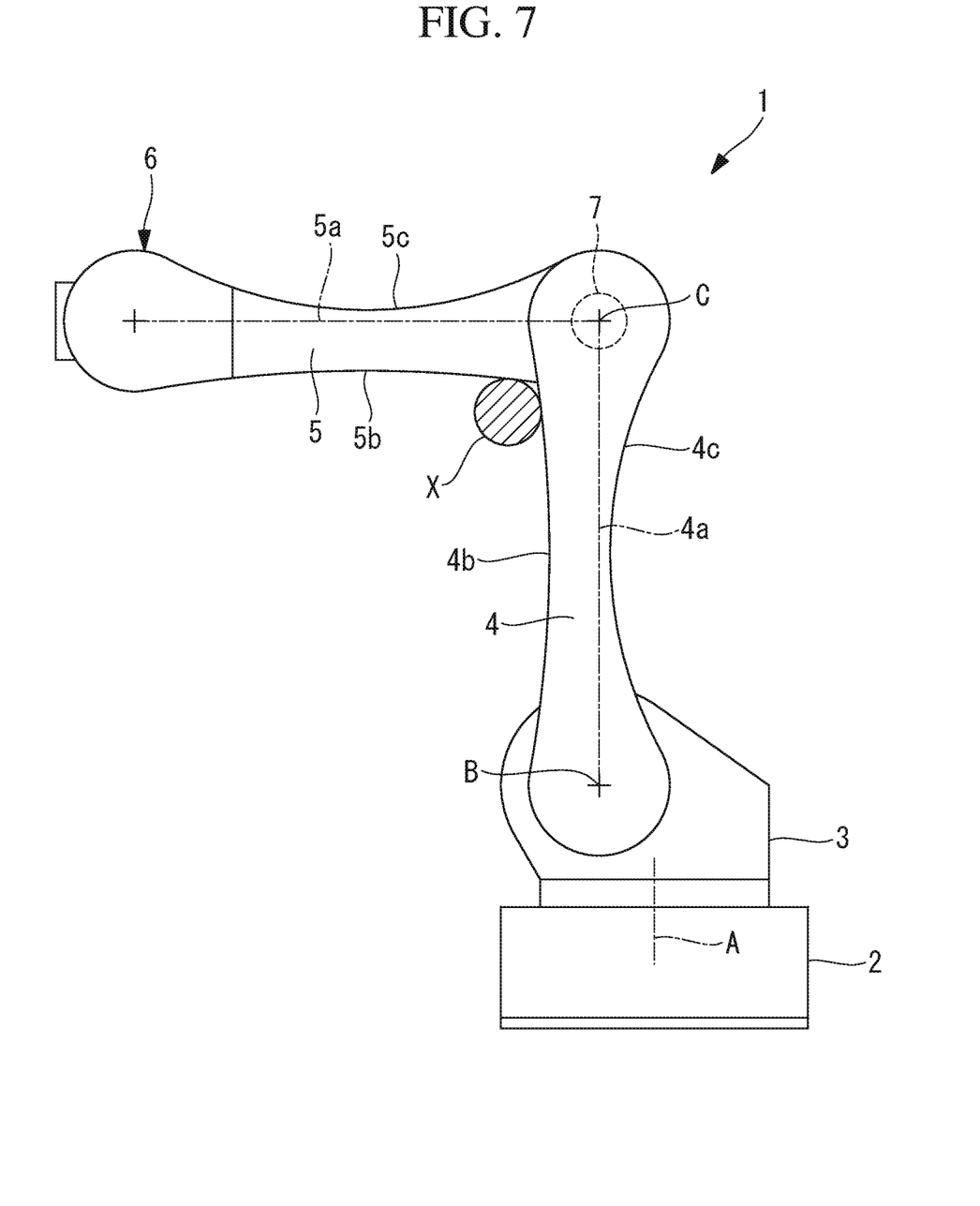
FIG. 7 is a side view illustrating another modification of the robot in FIG. 1.

In other words, the first arm 4 and the second arm 5, which have asymmetrical shapes with respect to the central axes 4a and 5a, in which inclined surfaces that approaches the central axes 4a and 5a in the vicinities of the centers in the lengthwise directions and are further separated from the central axes 4a and 5a with distances from the vicinities of the centers in the lengthwise directions are provided on both side surfaces 4b and 4c and side surfaces 5b and 5c, may be employed as illustrated in FIG. 7.

Figure 8:
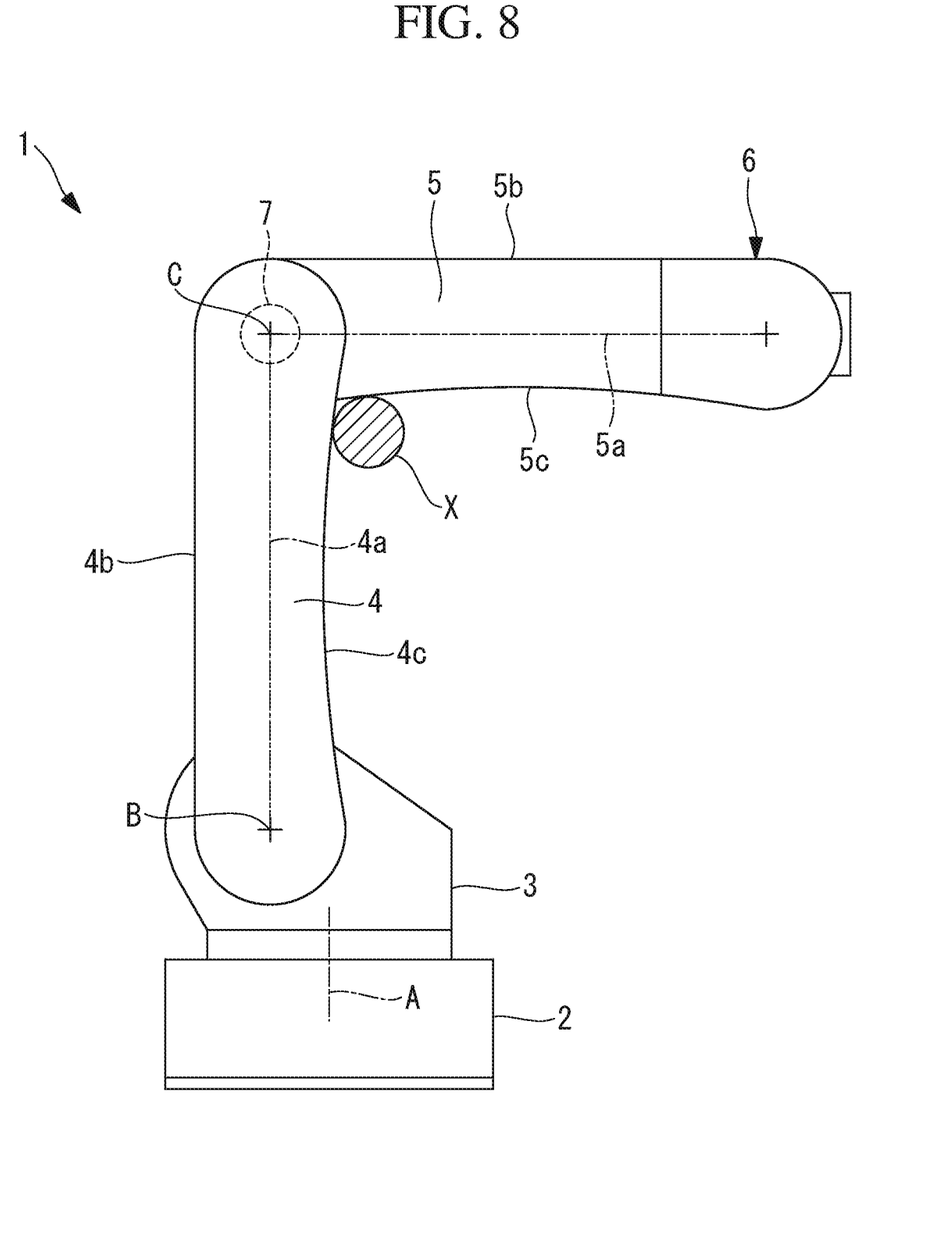
FIG. 8 is a side view illustrating another modification of the robot in FIG. 1.
Figure 9:
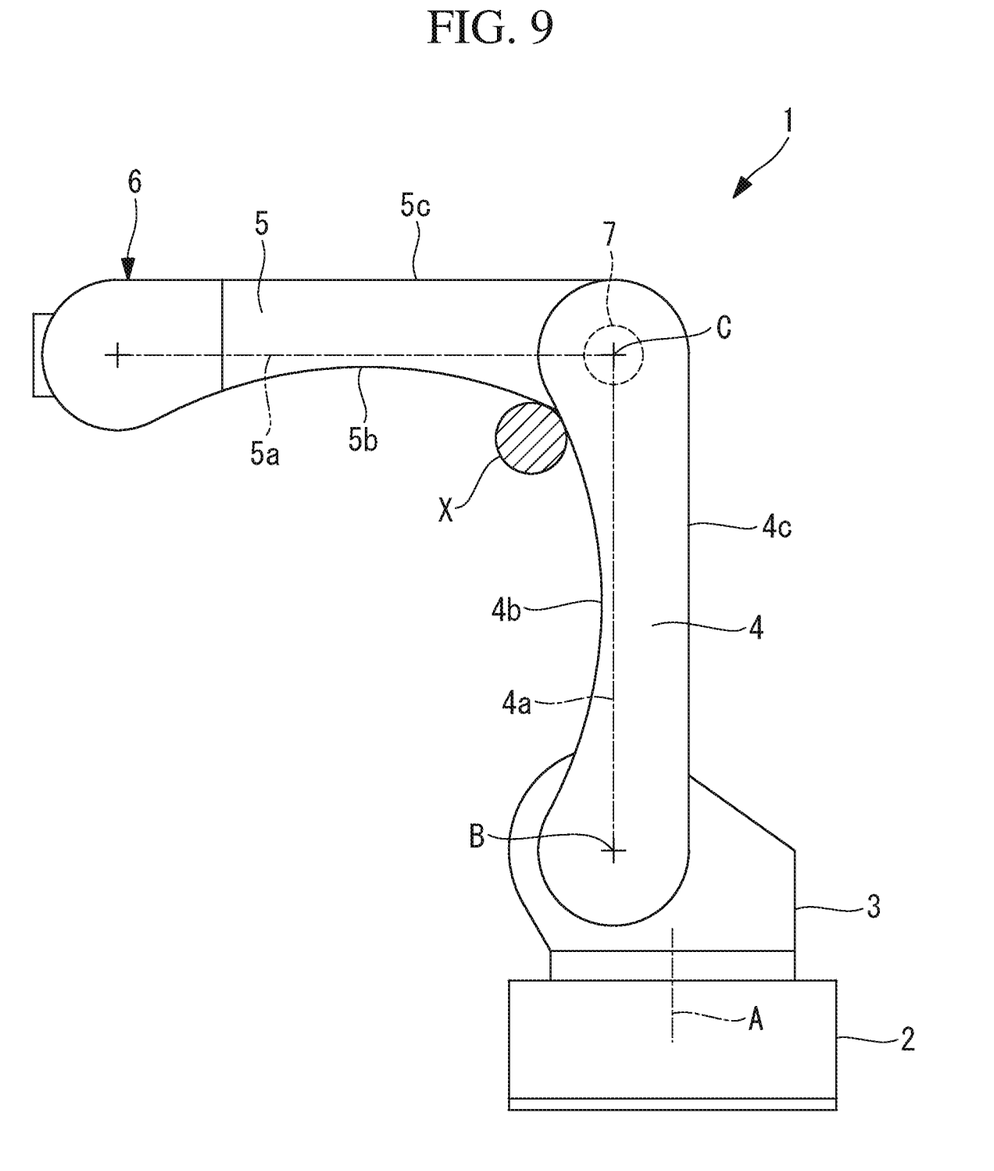
FIG. 9 is a side view illustrating another modification of the robot in FIG. 1.

Also, the first arm 4 and the second arm 5, in which side surfaces 4b and 5b on one side or the side surfaces 4c and 5c on the other side have arbitrary shapes, in which inclined surfaces that approach the central axes 4a and 5a in the vicinities of the centers in the lengthwise directions and are further separated from the central axes 4a and 5a with distances from the vicinities of the centers in the lengthwise direction are provided on the side surfaces 4c and 5c on the other side or the side surfaces 4b and 5b on the one side may also be employed as illustrated in FIGS. 8 and 9. Here, the arbitrary shapes specifically mean planes, inclined surfaces that approach the central axes 4a and 5a, inclined surfaces that are separated from the central axes 4a and 5a, or the like.

The invention claimed is:

1. A robot comprising:

two link members each of which has a longitudinal axis and that are coupled with each other by a joint so as to be configured to perform a relative rotation around an axial line of the joint;

a controller that is configured to control the relative rotation; and a sensor that is provided in the joint and measures a torque around the axial line wherein the controller is configured to identify that an object is pinched between the two link members when a relative angle of the two link members is decreasing by controlling the relative rotation and is configured to stop the relative rotation when the torque measured by the sensor exceeds a predetermined threshold value, and wherein the robot has such a shape that a width dimension in a direction along a plane of a cross-sectional surface of at least one of the link members, which perpendicularly intersects the axial line, on at least one side from the longitudinal axis that intersects the axial line, continuously spreads from at least a midway position of the at least one of the link members in a direction of the longitudinal axis toward the axial line so as to allow the object between the two link members to be moved by a pressurization force acting on the object between the two link members from the two link members in a direction away from the axial line until the torque measured by the sensor exceeds the predetermined threshold value when the relative angle of the two link members is decreasing to reduce the pressurization force when the torque measured by the sensor exceeds the predetermined threshold value.

2. The robot according to claim 1, wherein a first relative angle in the direction along the planes of cross-sectional surfaces of the two link members, which perpendicularly intersect the axial line, between respective longitudinal axes that intersect the axial line, is smaller than a second relative angle between outermost peripheral outlines of the two adjacent link members.

3. The robot according to claim 1, wherein outermost peripheral outline of each of the two link members has a linearly symmetrical shape with respect to the longitudinal axis that intersects the axial line.

4. The robot according to claim 1, wherein each of outer peripheries of the two link members form a continuous curvature from a point of intersection of the two link members to an opposite end of each link member.

* * * * *